United States Patent
Lee

[11] Patent Number: 5,923,759
[45] Date of Patent: Jul. 13, 1999

[54] SYSTEM FOR SECURELY EXCHANGING DATA WITH SMART CARDS

[76] Inventor: Philip S. Lee, c/o Applied Systems Institute, Inc., 1420 K St., NW., Suite 400, Washington, D.C. 20005

[21] Appl. No.: 08/950,790

[22] Filed: Oct. 15, 1997

Related U.S. Application Data

[63] Continuation of application No. 08/426,110, Apr. 20, 1995, abandoned.

[51] Int. Cl.⁶ .................................................. H04K 1/00
[52] U.S. Cl. .............................. 380/25; 380/23; 235/380; 340/825.31; 705/17
[58] Field of Search .................................. 380/24, 25, 23; 235/382, 382.5, 379, 380; 340/825.31; 705/17, 18

[56] References Cited

U.S. PATENT DOCUMENTS

| | | | |
|---|---|---|---|
| 4,639,889 | 1/1987 | Matsumoto et al. | 395/185.08 |
| 4,652,698 | 3/1987 | Hale et al. | 380/24 |
| 4,746,788 | 5/1988 | Kawana | 235/380 |
| 4,787,027 | 11/1988 | Prugh et al. | 380/24 X |
| 4,802,218 | 1/1989 | Wright et al. | 380/23 |
| 4,944,007 | 7/1990 | Austin | 380/21 |
| 5,036,461 | 7/1991 | Elliot et al. | 395/244 |
| 5,048,085 | 9/1991 | Abraham et al. | 380/23 |
| 5,146,499 | 9/1992 | Geffrotin | 380/23 |
| 5,148,481 | 9/1992 | Abraham et al. | 380/46 |
| 5,149,945 | 9/1992 | Johnson et al. | 235/380 |
| 5,195,130 | 3/1993 | Weiss et al. | 379/98 |
| 5,228,084 | 7/1993 | Johnson et al. | 380/23 |
| 5,379,344 | 1/1995 | Larsson et al. | 380/23 |
| 5,406,624 | 4/1995 | Tulpan | 380/4 |
| 5,448,638 | 9/1995 | Johnson et al. | 380/23 |
| 5,590,038 | 12/1996 | Pitroda | 395/241 |

FOREIGN PATENT DOCUMENTS 440 800 A1  12/1990  European Pat. Off. ........ B42D 15/10

*Primary Examiner*—Gail O. Hayes
*Assistant Examiner*—Pinchus M. Laufer
*Attorney, Agent, or Firm*—Finnegan, Henderson, Farabow, Garrett & Dunner, L.L.P.

[57] ABSTRACT

A card-enabled processing system comprises a security module for securely exchanging data with cards, such as smart cards, and an application module for processing data from the smart cards. The security module encrypts and decrypts data using keys, which are securely stored in a secure memory. The security module also validates the cards before processing by the application module occurs and assists the card in validating the system. The application module provides a common platform in which different types of smart cards can be processed.

16 Claims, 4 Drawing Sheets

SYSTEM FOR SECURELY EXCHANGING DATA WITH SMART CARDS

This application is a continuation of application Ser. No. 08/426,110, filed Apr. 20, 1995, now abandoned.

BACKGROUND OF THE INVENTION

1. Field of the Invention

The invention generally relates to systems for providing a secure processing environment. In particular, this invention relates to controllers used in card-enabled processing systems for providing secure access to data stored in data-carrying cards, including data received from smart cards, and for providing secure communications of processed data.

2. Description of the Related Art

Business, social, and government interactions in a technological society rely increasingly on electronically stored, processed, and accessed data. For example, data-carrying cards, such as "smart" cards having internal data processing capabilities, are used to store and process various types of data, like financial information, medical information, and welfare benefits information. Smart cards can store data relating to a transaction (e.g., a credit or a debit), eliminating the need for paper records. The use of such cards, however, raises several concerns.

One concern involves data security. Where data is sensitive or confidential, access to data stored on cards should be limited to those people with the appropriate authorization. Also, because data transmitted to and from cards can be easily duplicated or altered, data authentication is desirable to prevent fraudulent use of duplicated or altered data. To further prevent data manipulation and repudiation, data certification, which is a process of providing cryptographic proof of the origin and integrity of data, can be employed.

Another concern arises from the differences between smart cards' chip operating system (COS). Lack of clear industry standards in the smart card field results in incompatibilities between smart cards produced by different manufacturers. One manufacturer's smart card processing system often does not support another manufacturer's smart cards. This results in great inconvenience to smart card users, who are often unable to use their smart cards when they cannot locate systems capable of supporting their cards. Thus, there is a need for controllably bridging the incompatibilities of such systems. For example, if a user holds a debit card and wants to have his account debited immediately for a purchase, it would be desirable for any merchant who wants to make the sale to be able to accept and employ the user's debit card for that purpose, and to receive an immediate credit in his account. It would also be desirable for that merchant to be able to accept many other types of cards, such as credit cards and prepaid cards.

Despite the clarity of these needs, early attempts have proven to be inadequate. On the one hand, conventional systems have not provided adequate data security. A typical system aimed at providing a new service has a very limited environment and leaves an open end in terms of security. At present, one way that security is provided in smart cards systems is to implement security features as an integrated part of the systems' application. This tactic is inefficient and inherently dangerous—inefficient because of the effort associated with software development and the maintenance costs, and dangerous because application programmers still have access to the application program that provides the system security.

On the other hand, the broad-based usability that is desired for particular applications still eludes most of the likely users because of system differences large and small. Card-based systems from telephone to general credit to banking systems cannot accept cards not intended for the respective system, even when it would be to the economic advantage of the relevant business to do so. And despite the long-term need of the financial communities for a broad-based debit card, such a card and its touted advantage of a "cashless society" appears to be receding into the future. This state of events has occurred despite the proliferation of credit as a way of life and the proliferation of insertable cards as both data carriers and as "smart cards," cards which both carry data and perform some on-card processing of the data.

All of the foregoing problems have led to an over-arching need, particularly felt in the business community, to address security and the incompatibility of systems concurrently, and preferably as simply as possible. The need also extends beyond the business community, for example, to government. Even though the problems in the government area differ in detail, the same problems of security and incompatibility of systems are demanding attention.

SUMMARY OF THE INVENTION

Accordingly, the present invention is directed to a controller that substantially obviates one or more of the problems due to limitations and disadvantages of the related art.

In accordance with the purpose of the invention, as embodied and broadly described, the invention includes a system for controlling requests from portable electronic cards of differing in-card electronic processing capabilities, and including a central processing module, associated memory, and an operating system, comprising a plurality of card units into which data cards and cards having internal data processing may be inserted; security module means for authenticating cards inserted into the plurality of card units and for securely exchanging data with the authenticated cards; and means, separate from the security module means, for processing data received from the security module in accordance with an application program.

In another aspect, the invention includes a method of securely exchanging data between a data-carrying card and a processing system, comprising the steps of validating the authenticity of a data-carrying card at a security module of the processing system; providing data from the authenticated data-carrying card to the security module of the processing system; processing the data at the security module; providing the processed data from the security module to an application module; and processing the data at the application module.

In yet another aspect, the invention includes a system for providing secure exchange of data with data-carrying cards, comprising a first processor programmed to encrypt and decrypt data, the first processor being a secure processor; a secure memory connected to the secure processor for storing a security program and encryption and decryption keys; a second processor programmed to execute an application program in accordance with data received from the first processor.

In still another aspect, the invention includes a security module, comprising an input/output interface from which data can be received and transmitted; data-encryption means for encrypting data in accordance with an encryption technique using encryption keys; a memory for securely storing the encryption keys; and means for securely managing the encryption keys stored in the memory.

Additional features and advantages of the invention will be set forth in the description that follows, and in part will be apparent from the description, or may be learned by practice of the invention. The advantages of the invention will be realized by the systems and related methods of use particularly pointed out in the written description and claims hereof as well as the appended drawings.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention and are incorporated in and constitute a part of the specification and together with the description serve to explain the principles of the invention.

In the drawings.

DETAILED DESCRIPTION

The card-enabled processing system of the invention comprises at least a security module for providing secure exchange of data with data-carrying cards, including smart cards, and an application module for processing the data accessed by the security module in accordance with an application program(s). The security module controls the flow of data between the system and the data-carrying cards. The application module includes a card application programming interface, which allows access to cards issued by different manufacturers.

Figure 1:
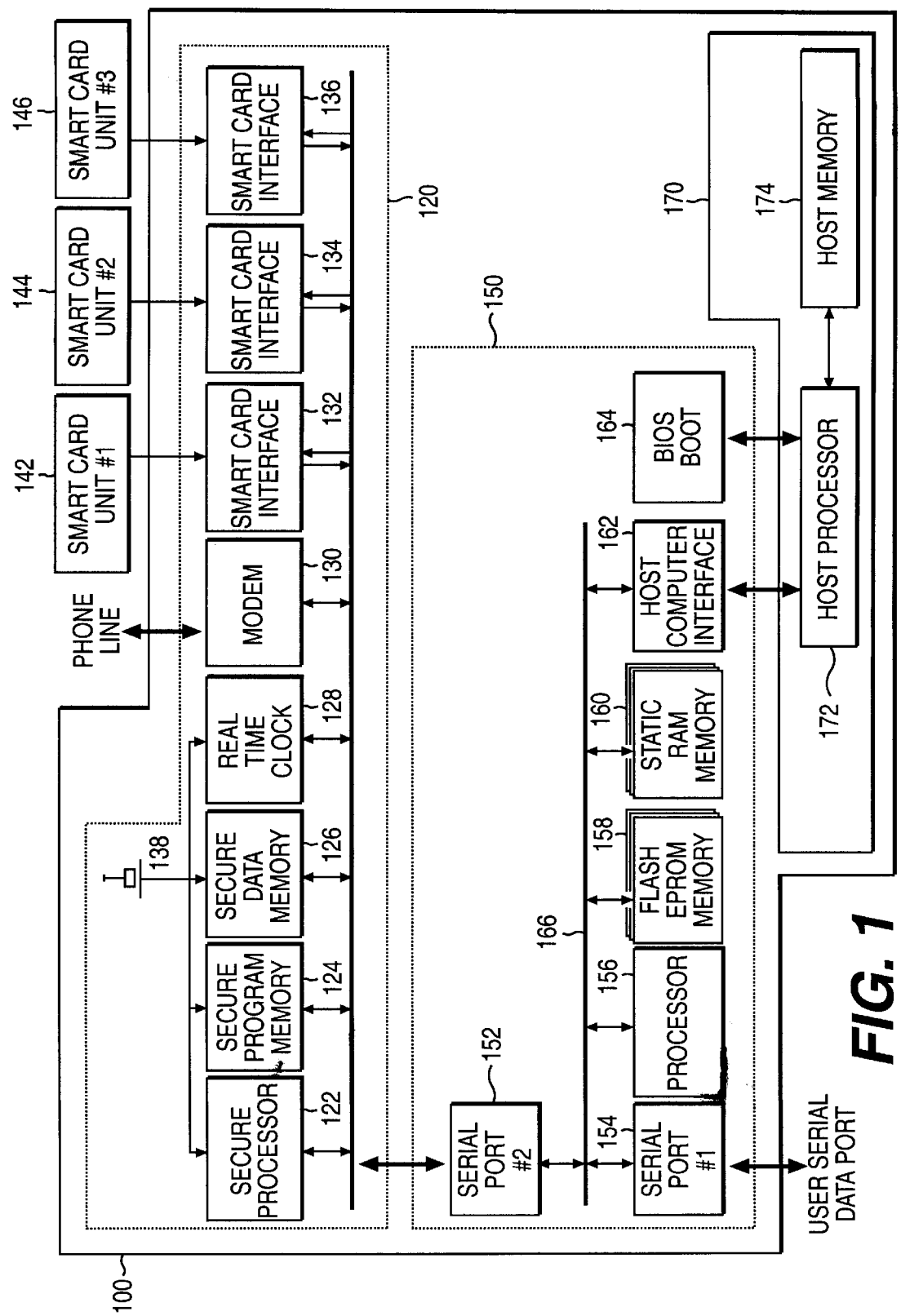
FIG. 1 is a block diagram of a card-enabled processing system having a security module and an application module in accordance with a preferred embodiment of the invention.

FIG. 1 illustrates a block diagram of a card-enabled processing system 100 including security module 120, application module 150, and host computer 170. Application module 150 is connected to security module 120 and host computer 170. In a preferred embodiment, security module 120 and application module 150 comprise programmable printed circuit boards, which are inserted into slots (not shown) of host computer 170.

As shown in FIG. 1, in a preferred embodiment, security module 120 includes secure processor 122, secure program memory 124, secure data memory 126, real time clock 128, modem 130, smart card interfaces 132, 134, 136, and back-up battery 138. Processor 122, memories 124, 126, clock 128, modem 130 and interfaces 132, 134, 136 are all connected to bus 140. Back-up battery 138 is connected to processor 122, memories 124, 126, and clock 128 and acts as an independent power source for these components.

Security module 120 generally provides secure access to data stored on data-carrying cards, including data from "smart cards," which have internal data processing capabilities. For example, security module 120 provides authorization verification to cards, authenticates cards inserted into system 100, validates the integrity of data from the cards, encrypts and decrypts data accessed to and from the cards, and provides secure storage and management of authentication, encryption, and certification "keys" used to encrypt and decrypt the data.

Secure processor 122 executes software (referred to herein as "the security program") stored in secure program memory 124. The functionality provided by processor 122 executing the security program is described in greater detail below in connection with FIG. 3. Processor 122 preferably contains a Data Encryption Standard (DES) engine for encrypting data to be stored on the cards and decrypting data received from the cards. Known encryption algorithms, such as Electronic Code Book (ECB) or Cipher Block Chaining (CBC), can also be used. These algorithms uniquely encrypt data based upon "encryption keys" (e.g., 64-bit numbers). Public key algorithms, such as digital signature algorithm (DSA) and RSA can also be used.

The encryption keys used to encrypt data received from smart cards are stored in secure data memory 126 and are preferably only accessible by processor 122. In one embodiment, the encryption keys themselves are encrypted by processor 122 before they are stored in memory 126. Processor 122 can request a key from memory 126, for example, by transmitting an encrypted index, or address, to memory 126. Memory 126 receives the encrypted address, decrypts the address, finds the key stored in that address, and transmits the key to processor 122.

To ensure the security of the data received from the smart cards, secure processor 122, secure program memory 124, and secure data memory 126 are preferably designed such that any physical tampering causes the contents of these devices to be erased. In a preferred embodiment, processor 122 comprises a DT2252 secure microprocessor with its associated program and data memories 124 and 126.

Real time clock 128 maintains the current date and time and preferably comprises a quartz-based clock. When directed by the security program, processor 122 receives the date and time from clock 128 and stores them on the smart cards. For instance, when a charge has been made on a credit card, the amount of the charge can be stored on the credit card along with the date and time of the charge.

As shown in FIG. 1, modem 130 is connected to an external phone line. Modem 130 interfaces with system 100 via an interface (not shown), such as a Signectics UART SC68C94 quad chip. Modem 130 allows remotely-located host systems, which may also be responsible for key distribution and key management, to communicate with system 100 through security module 120. Data received from modem 130 is directed to processor 122, which authenticates the data in accordance with the security program. Modem 130 can be any commercially-available modem and preferably uses the Hayes AT command set. An example of such a modem is the Cermetek CH1782 2400 baud modem.

Smart card interfaces 132, 134, 136 interface smart card units 142, 144, 146, respectively, with system 100. Preferably, these interfaces 132, 134, 136 are connected to bus 140 via, for example, the Signectics UART SC68C94 quad chip. Units 142, 144, 146 accept manual insertion of the cards and establish direct electrical contact with the cards. Units 142, 144, 146 read data from the cards to the respective interfaces and write data from the respective interfaces to the cards. While card units 142, 144, 146 are shown in FIG. 1 to reside outside system 100, they can alternatively be mounted in security module 120 as part of system 100.

It is noted that units 142, 144, 146 are connected to system 100 via security module 120 only. In this way, data accessed from cards inserted in units 142, 144, 146 can be verified and, if necessary, decrypted by the security program before processing by application module 150 occurs. Also, data from application module 150 can be verified and encrypted by the security program before being stored on these cards.

Application module 150 receives data from security module 120 and processes this data. One aspect of application module 150 is its adaptability to a wide-variety of different data carrying and data processing-type cards. As shown in FIG. 1, application module 150 comprises serial ports 152, 154, processor 156, EPROM 158, RAM 160, host computer interface 162, and BIOS boot 164, all of which are connected to bus 166.

Serial port 152 interfaces application module 150 with security module 120, allowing data from security module 120 to be transmitted to application module 150 and vice-versa.

Serial port 154 allows other systems running data gathering applications, to communicate with application module 150. Preferably, serial port 154 comprises a standard RS-232 port, to which compatible serial data ports of other systems can be connected via cable. For example, a transaction collection platform can be linked to system 100 through serial port 154, allowing system 100 to receive, process, and transmit transaction data to a host system via modem 130.

Processor 156 executes programs stored in EPROM 158 and stores data in RAM 160. Processor 156 preferably comprises a 80C186EB PC CPU, which can run with a 16 MHz or 32 MHz oscillator clock (not shown). The programs stored in EPROM 158 can include a "card application programming interface" (CAPI™), which allows system 100 to read data from and write data to most types of smart cards, and application program(s), which define how the data from the card is to be processed. Examples of application programs include programs that maintain medical histories and/or welfare benefit histories, programs that credit charges to accounts, and programs that debit charges from accounts. The interaction between CAPI and the application program is described below in connection with FIG. 4.

As discussed above, application module 150 preferably comprises a programmable printed circuit board and has a parallel 64 pin, card edge connector (not shown), which is inserted into a slot (not shown) of host computer 170. Module 150 communicates to the host computer 170 through the connector via host computer interface 162. Interface 162 is preferably a conventional interface capable of generating processor interrupts for processor 156 based upon a buffer status, such as the Am4701 FIFO Interface.

BIOS boot 164 provides boot time access control and provides an interface between input/output devices of host computer 170, such as a host monitor (not shown) and a keypad (not shown), CAPI, and security module 120, for example, to validate personal identification numbers (PINs).

Host computer 170 includes host processor 172 and host memory 174, which are connected to each other as shown in FIG. 1. In a preferred embodiment, host computer 170 comprises a personal computer, such as the IBM PC or suitable compatible, having a plurality of slots in which security module 120 and application module 150 can be inserted. Host computer 170 also preferably includes input/output devices, such as a keypad (not shown) and a display (not shown), to permit a user to receive and input information into system 100.

Host processor 172 can execute an operating environment, such as an operating system, which is independent of the application programs executed by processor 156 and the security program stored in program memory 124. Host processor 172 also preferably executes software that controls the input/output devices of host computer 170, including interface programs for prompting the user to enter desired information, such as a PIN.

Although the preferred embodiment of the invention has been described as including an application module having its own processor for executing application programs independent of the host processor, the application programs described above could alternatively be executed directly by the host processor 172. Similarly, the processor of the application module could execute some or all of the functionality described as being implemented by the host processor.

Figure 2:
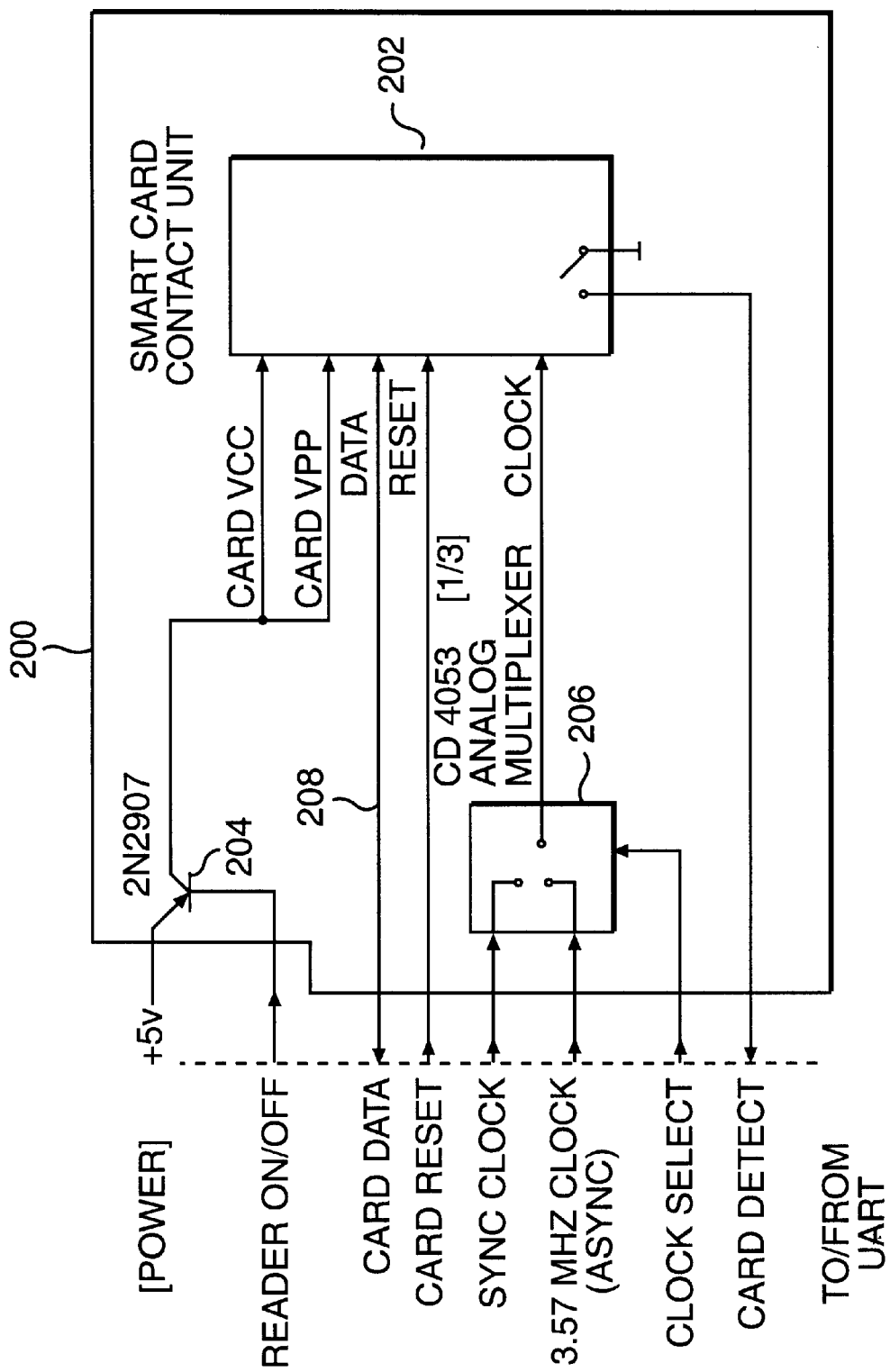
FIG. 2 is a block diagram illustrating circuitry of a smart card unit used in the system of FIG. 1.

FIG. 2 illustrates circuitry of a card unit 200 which may be used for card units 142, 144, 146 shown as blocks in FIG. 1. Card unit 200 includes contact unit 202 which has a slot for insertion of a portable data-carrying card or smart card, control transistor 204 which controls whether the reader is on or off in accordance with a "reader on/off" signal, and analog multiplexer 206 for switching between a synchronous clock and an asynchronous clock, so that multitude of data carrying cards (e.g., smart cards) can be accepted by security module 120. Contact unit 202 receives data from and sends data to a card interface over a "card data" line 208.

Figure 3:
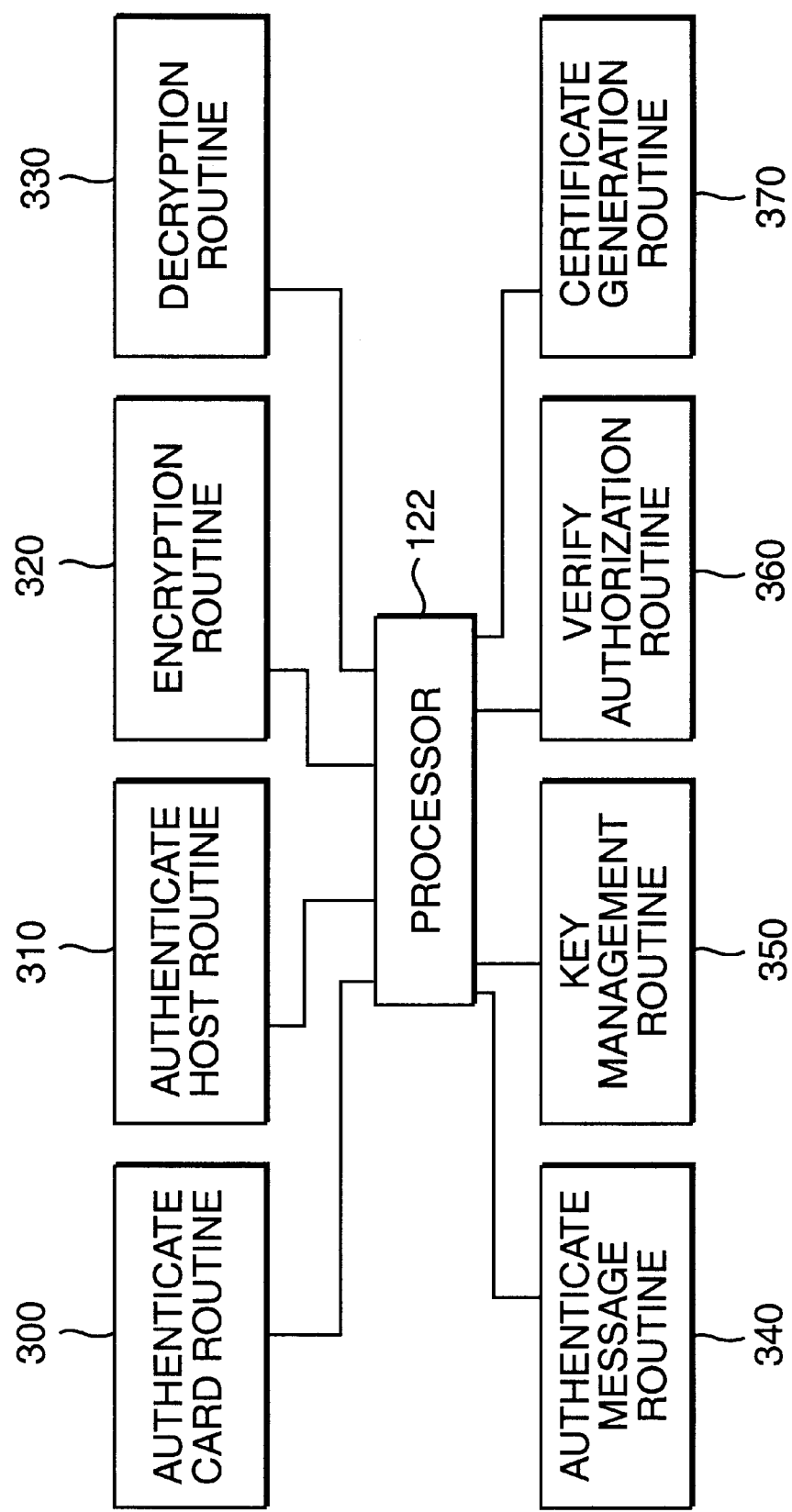
FIG. 3 is a block diagram depicting exemplary routines of a security program, in accordance with one embodiment of the invention.

FIG. 3 illustrates a block diagram depicting exemplary routines of the security program executed by processor 122, in accordance with one embodiment of the invention. The security program includes Authenticate Card Routine 300, Authenticate Host Routine 310, Encryption Routine 320, Decryption Routine 330, Authenticate Message Routine 340, Key Management Routine 350, and Verify Authorization Routine 360, and Certificate Generation Routine 370. These routines are executed by processor 122, preferably when and as needed to secure data handled by the application program stored in memory 158.

Authenticate Card Routine 300 is provided to allow system 100 to determine whether a card inserted into one of the card units is authentic (e.g., issued by an authorized institution). Under routine 300, processor 122 generates a random number and transmits it to the card. The card receives the random number, encrypts the number based upon an algorithm and an "internal key" stored in the card, and returns the encrypted random number to processor 122. The internal key uniquely identifies the card as being an authentic card. Processor 122 decrypts the number based upon the same algorithm and an identifying key stored in memory 126. Processor 122 compares the original random number and the decrypted random number. If they are the same, processor 122 determines that the card is authentic. In contrast, if they are different, processor 122 determines that the card is not authentic.

Authenticate Host Routine 310 is provided to allow a card to determine whether the processing system in which the card is inserted is authentic. Under routine 310, the card generates a random number and transmits it to processor 122. Processor 122 receives the random number, encrypts the random number based upon an algorithm and an identifying key stored in memory 126, and returns the encrypted random number to the card. The card decrypts the received number from processor 122 based upon the same algorithm and an internal key stored in the card. Again, the internal key uniquely identifies the card as being authentic. The card compares the original random number with the decrypted random number. If they are the same, the card determines that system 100 is authentic. In contrast, if they are different, the card determines that system 100 is not authentic.

As their names suggest, encryption routine 320 encrypts data and decryption routine 330 decrypts data. These routines are executed when data is transmitted from or received by system 100, and are particularly valuable for data that is sensitive or confidential. As discussed above, the encryption and decryption algorithms employed by system 100 use encryption and decryption keys to uniquely encrypt and decrypt data, respectively. Known algorithms may be used, including "symmetrical" algorithms (e.g., decryption keys are derivable from encryption keys), such as DES, ECB, or CBC, and "asymmetrical" algorithms, such as DSA and RSA. Although data encrypted using asymmetrical algorithms is generally more secure than data encrypted using symmetrical algorithms, symmetrical algorithms are often adequate. As discussed above, the keys are securely stored in memory 126.

Authenticate Message Routine 340 allows a card to determine whether data from system 100 is authentic. Secure processor 122 generates a message authentication code (MAC) from data that processor 122 transmitted to the card based upon an algorithm and a MAC key stored in memory 126 and transmits the MAC to the card. The card generates its own MAC from the data it received from processor 122 based upon the same algorithm and a MAC key stored in the card. The card compares the MAC generated by the card and the MAC generated by the processor 122. If they are the same, the card determines that the data is authentic. In contrast, if they are different, the card determines that the data is not authentic. This routine 340 can also operate to allow processor 122 to determine whether data received from a card is authentic. In that case, processor 122 compares the MACs generated by processor 122 and the card and makes a determination of whether the data from the card is authentic.

Key management routine 350 is responsible for maintaining, creating, issuing, changing, setting, storing, and retrieving encryption and decryption keys stored in memory 126. Routine 350 creates encryption keys for new application programs as they are required. Preferably, each application program is only allowed to have a set number of encryption keys corresponding to that application program. During execution of an application program, routine 350 can set only one key to be active at a time. Thus, at any given time, the key currently set by routine 350 is the only one that is available.

When processor 122 retrieves encryption and/or decryption keys from memory 126 in accordance with routine 350, processor 122 transmits an index, preferably encrypted, which corresponds to an address in memory 126. The key associated with that index, or address, is then returned.

Verify Authorization Routine 360 determines whether the user is authorized to use the card inserted into system 100. Under routine 360, system 100 prompts the user to enter a PIN. Processor 122 encrypts the PIN and transmits it to the card. The card decrypts the received PIN and compares it with a PIN stored in the card. If the PINs match, then system 100 determines that the user is authorized and allows the user to gain entry into system 100. However, if the PINs do not match, then system 100 determines that the user is not authorized to use the card.

Certificate Generation Routine 370 generates "certificates" or "signatures" from blocks of data and appends the certificates or signatures to the blocks of data. Preferably, in generating the certificates or signatures, routine 370 processes the blocks of data using an algorithm and a certification key stored in memory 126. For each block of data, routine 370 appends the generated certificate or signature to the block of data. In this way, the integrity of the data blocks can be maintained by reconstructing the blocks of data from the certificates or signatures, if necessary. Also, using the certificates or signatures, system 100 can provide non-repudiation of the blocks of data.

In a preferred embodiment, routines 300, 310, 320, 330, 340, 350, 360, 370 comprise software routines, such as microcode, executed by processor 122 and any hardware necessary to effect the execution of that microcode in accordance with conventional techniques to perform the specified functionality. In an alternative embodiment, this functionality can be implemented solely in hardware (e.g, electronic circuitry) in accordance with conventional techniques, or partly in software and partly in hardware.

In alternative embodiments of the security program, other routines can be provided in the security program. These routines may provide different security functions from those described above. For example, the Appendix attached hereto lists and describes routines which can be included in the security module and depicts these routines as flow diagrams.

Figure 4:
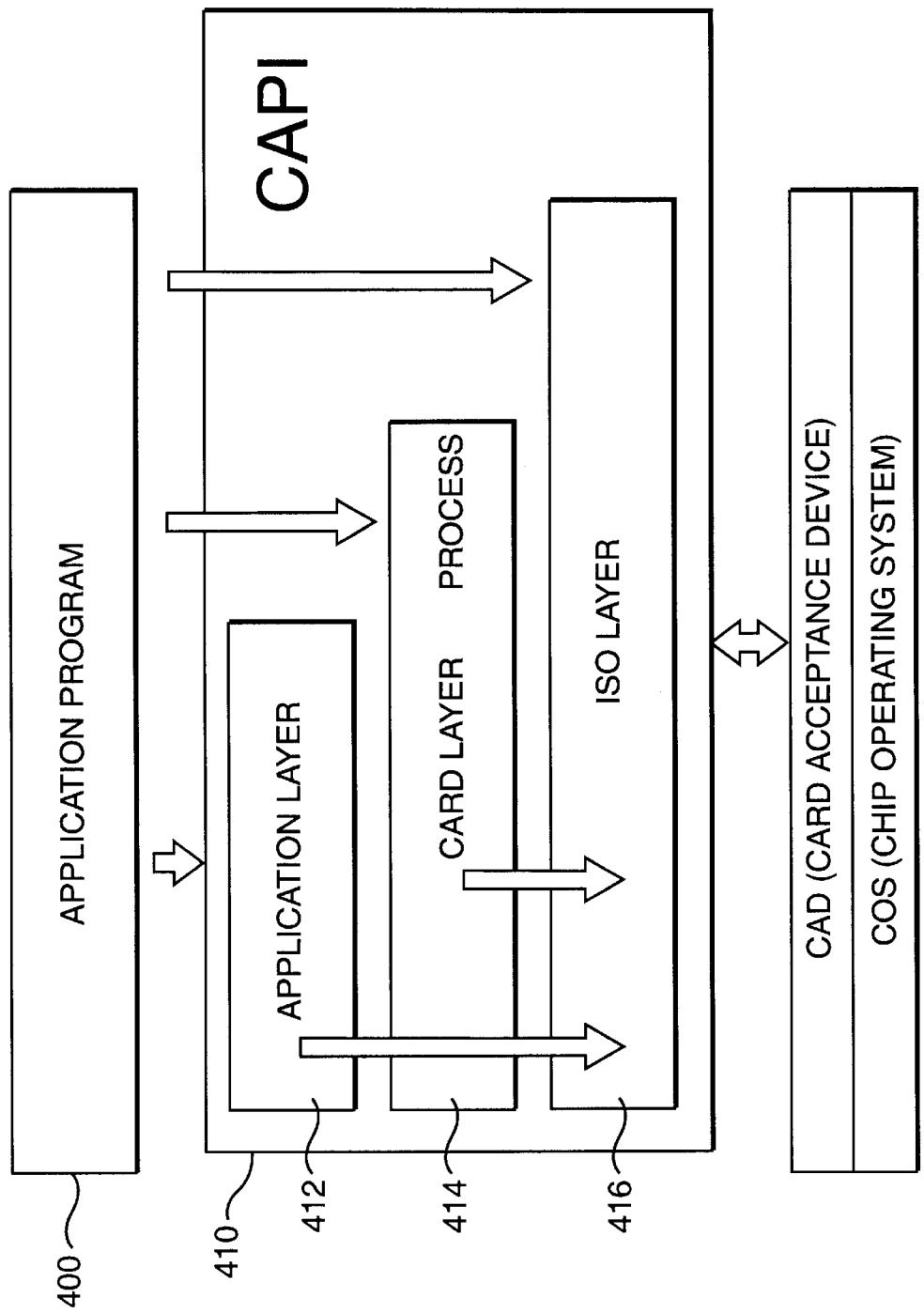
FIG. 4 illustrates a conceptual view of the programs executed in accordance with a preferred embodiment of the invention.

FIG. 4 provides a conceptual view of the programs executed by processor 156, including application program 400 and CAPI 410 (CAPI™ stands for card application program interface). As shown in FIG. 4, CAPI includes application layer 412, card layer 414, and International Standards Organization (ISO) layer 416. This structure provides flexibility during execution, for example, by allowing data from application program 400 to flow directly to the application layer 412 or directly to card layer 414 or directly to the ISO layer 416. In addition, certain data from the application layer 412 can pass serially through the subordinate functions represented by card layer 414 and the International Standards Organization Layer 416.

Application program 400 resides in the host 170 and/or the application module 150, or is imported from the card by application module 150. Program 400 processes data from smart cards and performs appropriate transactions with that data. During execution of application program 400, data can be read from or stored on smart cards inserted into system 100. Various different types of application programs can be implemented. For instance, application program 400 can be a debit program which debits charges from a user's bank account. In this case, as a preliminary matter, the application program 400 preferably commands the security module to verify use of the card by executing the verify authorization routine 360, the authenticate card routine 300, and the authenticate host routine 310.

If verification is successful, application program 400 causes processor 156 to receive debit information from the card, such as an account number, maximum debit per day, maximum debit per transaction, and total debit per day, through CAPI. Under control of program 400, processor 156 communicates with a system belonging to the user's bank (not shown) via serial port 154, or alternatively modem 130, to verify that the user's account contains sufficient funds to cover the charge. If so, then processor 156 determines whether the charge is proper (e.g., the charge is below the maximum debit per transaction) and transmits an appropriate request (e.g., if proper, charge the account). Processor 156 transmits transaction data to the inserted card for storage therein via the security module and concludes the session between the card and system 100. Alternatively, serial port 154 and modem 130 can also be used to download transaction data to the remote system. In addition, processor 122 or 156 can execute proprietary host communication protocols to exchange data and secret keys, such as encryption keys.

Numerous different types of application programs can be provided for application program 400, such as credit transaction programs, prepaid-card programs, medical history programs, and welfare benefit programs. Preferably, multiple application programs are stored in memory 156 so as to support a wider variety of card types (e.g., debit cards, credit cards, prepaid cards). If none of the application programs provided in memory 156 support the type of card inserted into system 100, then system 100 informs the user that the user's card cannot be processed by this system. In another embodiment, the application program can be read in from the inserted card, subject to verifications by the security module 120.

CAPI 410 allows application programs to communicate with different types of cards using different protocols without the need for the application programs to be card specific. Application layer 412 is the primary interface between the cards and the application programs and provides management of the smart card environment through simplified industry specific tool sets. The card layer 414 provides direct access to the smart card functions. ISO layer 416 controls system functions of the card units, which functions have already been conformed or established as industry standards. Since a smart card is a computer with its own chip operating system (COS), when the card is powered on or reset, the card returns an "ANSWER-TO-RESET" (ATR) to a terminal (e.g., card reader). Card layer 414 processes the ATR and translates application layer 412 calls into card dependent commands, and passes the commands to the ISO layer 416. Hence, the application remains transparent to changes of card or system. CAPI allows applications to remain the same for different card manufacturers or COSs.

Software routines which can be included in the application layer, the card layer, and the ISO layer are listed and depicted as flow diagrams in the attached Appendix.

Accordingly, in accordance with the invention, the security module serves as an intermediary between smart cards and the application module, thereby ensuring a secure environment in the system. Also, because the application program running in the host 170 does not provide system security, the risk that application programmers will be able to access the system 100 is minimized.

It will be apparent to those skilled in the art that various modifications and variations can be made in the system of the present invention without departing from the spirit or scope of the invention. Thus, it is intended that the present invention cover the modifications and variations of this invention provided they come within the scope of the appended claims and their equivalents.

What is claimed is:

1. A system for controlling requests from portable electronic cards of differing in-card electronic processing capabilities, and including a central processing module, associated memory, and an operating system, comprising:

a plurality of card units into which data cards and cards having internal data processing may be inserted;

security module means, directly connected to said plurality of card units, for authenticating cards inserted into the plurality of card units and for securely exchanging data with the authenticated cards; and means, separate from the security module means, for processing data received from the security module in accordance with an application program.

2. The system according to claim 1, wherein said security module comprises means for providing data security for multiple applications.

3. The system according to claim 1, wherein the data processing means comprises an application module, the application module including:

means for interfacing a plurality of differing data carrying cards with the application module.

4. The system according to claim 1, wherein the data processing means comprises:

means for transferring data to and from files that relate to an application program of a particular card through the security module.

5. The system according to claim 1, wherein the security module comprises:

means for validating a plurality of properties of the cards, including validating an internal key.

6. The system according to claim 1, wherein the security module includes a secure microprocessor means for encrypting and decrypting data.

7. The system according to claim 6, wherein the security module includes a first secure memory means for securely storing encryption keys.

8. The system according to claim 6, wherein the security module includes a secure memory for securely storing a security program.

9. A method of securely exchanging data between a data-carrying card and a processing system, comprising the steps of:

validating the authenticity of a data-carrying card at a security module of the processing system;

securely providing data from the authenticated data-carrying card to the security module of the processing system;

processing the data at the security module;

providing the processed data from the security module to an application module; and processing the data at the application module.

10. The method according to claim 9, wherein the step of validating the authenticity of the data-carrying card includes the steps of:

providing a random number in the processing system;

transmitting the random number from the processing system to the data-carrying card;

encrypting the random number at the data-carrying card using a first internal key stored in the card;

providing the encrypted number from the card to the processing system;

decrypting the encrypted number at the processing system using a second internal key stored in the processing system;

comparing the decrypted number with the random number in the processing system; and determining that the data-carrying card is authentic if the decrypted number and the random number in the processing system match.

11. The method according to claim 9, further comprising the step of validating the authenticity of the processing system at the data-carrying card.

12. The method according to claim 11, wherein the step of validating the authenticity of the processing system includes the steps of:

providing a random number in the data-carrying card;

transmitting the random number from the card to the processing system;

encrypting the random number at the processing system using a first internal key stored in the card;

providing the encrypted number from the processing system to the card;

decrypting the encrypted number at the card using a second internal key stored in the card;

comparing the decrypted number with the random number in the card; and determining that the processing system is authentic if the decrypted number and the random number in the card match.

13. The method according to claim 9, further comprising the steps of:

verifying that a user is authorized to use the card.

14. The method according to claim 9, wherein the step of processing the data at the security module includes the step of decrypting the data using decryption keys.

15. The method according to claim 9, further comprising the steps of:

providing the processed data from the application module to the security module;

processing the provided data at the security module; and storing the processed data from the security module on the data card.

16. The method according to claim 15, wherein the step of processing the data at the security module includes the step of encrypting the data using encryption keys.

\* \* \* \* \*